United States Patent [19]
Chamberlain

[11] Patent Number: 5,640,289
[45] Date of Patent: Jun. 17, 1997

[54] APPARATUS AND METHOD FOR NON-FRICTION AND NON-SLIDING CONTACT OF AN ACCESS ARM DURING MERGING OF A COMPUTER MASS STORAGE DEVICE

[75] Inventor: Stanley C. Chamberlain, Colorado Springs, Colo.

[73] Assignee: Quantum Corporation, Milpitas, Calif.

[21] Appl. No.: 423,898

[22] Filed: Apr. 18, 1995

[51] Int. Cl.⁶ .............................. G11B 5/54; G11B 21/22
[52] U.S. Cl. .................................................... 360/105
[58] Field of Search ............................... 360/106, 105, 360/128; 369/256; 92/34

[56] References Cited

U.S. PATENT DOCUMENTS

| | | | |
|---|---|---|---|
| 3,585,618 | 6/1971 | Stansell | 360/105 |
| 4,166,284 | 8/1979 | Daniels | 360/106 |
| 5,296,985 | 3/1994 | Mochizuki et al. | 360/105 |

OTHER PUBLICATIONS

"Motorize Your Lab with Our Compact Picomotor," Motorized Positioners model brochure (date unknown), pp. 40–44.
"Closed–Loop Micrometer Replacement Actuators," Motorized Positioners brochure, 850B Series, Newport, (date unknown) pp. J–30—J–31.

*Primary Examiner*—Stuart S. Levy
*Assistant Examiner*—Kevin M. Watkins
*Attorney, Agent, or Firm*—John C. Chen; William J. Kubida

[57] ABSTRACT

A positioning apparatus, and associated method, for laterally positioning the head/access arms of a computer mass storage device disk drive relative to the individual storage media disks thereof. The relative lateral positions of the head/access arms and the corresponding disks are determined, and the access arms are laterally translated to permit a merging operation of the various head/access arms and disks of a disk stack to be performed. The head/access arms are positioned by the application of biasing forces which are normal to the longitudinal axes of the access arms to laterally position the access arms without sliding engagement between the positioning apparatus and the access arms.

11 Claims, 7 Drawing Sheets

APPARATUS AND METHOD FOR NON-FRICTION AND NON-SLIDING CONTACT OF AN ACCESS ARM DURING MERGING OF A COMPUTER MASS STORAGE DEVICE

BACKGROUND OF THE INVENTION

The present invention relates generally to the assembly of a computer mass storage device having one or more data transducer access arms for positioning associated read and/or write heads proximate to selected data locations of one or more rotatable storage media. More particularly, the present invention relates to an apparatus, and an associated method, for laterally positioning a number of head/access arms relative to the individual planes of a stack of one or more rotatable storage media to permit contactless merging of the access arms and associated data transducers together with the storage media stack during assembly of a computer mass storage device head disk assembly ("HDA").

The positioning apparatus of the present invention laterally positions a head/access arm by applying forces to the access arm in a direction normal to a longitudinal axis thereof to displace the head access arm axially with respect to the plane of the associated disk. Because normal forces only are applied to laterally position the head/access arm with respect to the storage media, sliding contact between the positioning apparatus and the access arm is not encountered. As a consequence, contamination of the storage media caused by small, usually ferrous particles which might otherwise be generated as a result of sliding contact between a conventional positioning apparatus and the head/access arm is thereby avoided. Moreover, the positioning apparatus herein disclosed may be readily adapted to the manufacture of disk drives of ever smaller form factors and, when the disk drive incorporates a multiple number of storage disks concentrically arranged in a stack, the lateral positioning of individual ones of the head/access arms can also be individually adjusted medially between adjacent disks.

A magnetic disk drive is one type of computer mass storage device. Conventionally, a magnetic disk drive includes one or more rotatable magnetic disks or "platters". The magnetic disks contain a plurality of storage locations, generally arranged in concentric tracks, on which data may be stored. Conventionally, when the disk drive contains more than one magnetic disk, the magnetic disks are stacked in a vertical array and are mounted on a common axis or spindle of a spindle motor. During operation of the magnetic disk drive, the spindle motor is powered to cause a central hub together with the disk stack to rotate about the spindle.

The storage locations of the magnetic disks are accessed by a data transducer, commonly referred to as a read/write "head" which spans the rotating storage media disks. Data stored on the magnetic disks is encoded as bits of information comprising magnetic field reversals contained on the magnetically-hard surfaces of the magnetic disks. The head senses the magnetic fields of the storage locations and converts them into electrical signals to perform a "read" operation. At least one transducer is typically associated with each surface of a magnetic disk and, typically, a downhead transducer is positioned above each magnetic disk to access storage locations on an upper surface of the disk and an uphead transducer is positioned beneath each magnetic disk to access storage locations on a lower surface of the disk.

The heads are affixed at the distal end of an access arm which is attached at a proximal end to a positioner motor, usually a voice coil motor ("VCM"), which moves the access arm, together with the head, in an arcuate path across the surfaces of the magnetic disk. Conventionally, when the disk drive includes a plurality of access arms and associated heads associated with the individual disks in a stack, the access arms are all rigidly attached, or ganged, to a common positioner to move in unison.

When a plurality of storage media disks are mounted to a common spindle, the individual disks are spaced apart by small vertical separation distances to permit downhead and uphead transducers to access storage locations on the facing surfaces of adjacent ones of the disks. The vertical spacing between adjacent ones of the magnetic disks must therefore be great enough to permit the heads to access the storage locations of the respective disks. However, the individual disks must be located as closely together as possible in order to maximize the available storage capacity of the drive for any particular given form factor.

In normal operation, the heads do not physically contact the surfaces of the individual storage disks as such contact can either damage the head or unintentionally alter the values of the stored data. Contact between the head and the media can also permanently damage the disks rendering it impossible to read and/or write data to the affected area. Moreover, during assembly of the disk drive, the head transducers must initially be laterally positioned relative to the individual disks in the stack. Contact between the head, or the access arms which support the transducers, is possible during assembly of the disk drive if care is not exercised. To prevent damage to the magnetic disks during assembly of the disk drive, it is important to ensure that neither the head nor the access arm contact the surfaces of the magnetic disks.

Positioning of the head/access arm assemblies proximate to the magnetic disks during assembly of the disk drives is referred to as "merging" of the head/access arm assemblies together with the disks. Prior to merging, the head/access arm assemblies and the magnetic disks must be precisely positioned so that contact does not occur when the head/access arm assemblies are merged together with the disks.

As disk drives have and continue to become ever more miniaturized, even greater precision in the relative positioning of the head/access arm assemblies and the individual disks is required. As previously noted, with this increased miniaturization, the distance separating adjacent magnetic disks is reduced leaving less margin for error when laterally positioning the head/access arm assemblies relative to the disks. Current methods for merging the head/access arm assemblies with the disk stack involve applying small biasing forces to the access arms of the head/access arm assemblies. The biasing forces cause flexing of the access arms to alter their relative axial position with respect to the individual planes of the disks in the disk stack and this flexing of the access arms also alters the lateral positions of the individual heads suspended therefrom.

Such existing methods, however, may utilize positioning elements which engage the access arms and slide across their surfaces to effectuate the positioning operation. This sliding contact is not frictionless and abrasion between the positioning elements and the access arms may result. This abrasion can then generate particulate contamination which can settle upon the surfaces of the magnetic disks or otherwise contaminate the internal mechanism and electronics of the HDA. Inasmuch as the access arm and the positioning elements are usually formed of a ferrous-based alloy, any contamination of magnetic disks caused by such particles is particularly deleterious due to the potential for altering the magnetic properties of the disks.

Moreover, while conventional merging systems strive to minimize this sliding contact, a great deal of contamination can originate with the mechanism that moves the positioning elements themselves. Use of a cam, sliding shaft or wedge mechanisms all generate metal particles in close proximity to the disks and heads.

Means for laterally positioning the head/access arm assemblies relative to the magnetic disks of a disk drive which overcomes the problems associated with existing positioning methods apparatus would therefore be advantageous.

It is with respect to these considerations and other background information relative to computer mass storage media drives that the improvements of the present invention have evolved.

SUMMARY OF THE INVENTION

Accordingly, the present invention advantageously provides a positioning apparatus, and an associated method, for laterally positioning the head/access arms of a disk drive relative to the plane of the individual media disks to permit contactless merging of the head/access arms together with the individual disks of the disk drive during assembly of the HDA. The apparatus and method of the present invention has particular applicability for use in the assembly of "rigid", "fixed", "hard" or Winchester disk drives but is also applicable to the merging of transducer/access arm assemblies with the individual storage media in other types of computer mass storage devices utilizing one or more rotating storage media.

The positioning apparatus laterally positions the head/access arms relative to the planes of the individual disks by applying forces in directions normal to the longitudinal axes of the access arms without sliding contact. Because no sliding contact between the positioning apparatus and the access arms occur, little or no abrasion between the two elements results. As a consequence, the problems generally associated with the generation of particulate contamination resulting from sliding contact between conventional positioning apparatus and the access arms of the head/access arm assemblies are therefore avoided. Moreover, the positioning apparatus disclosed herein removes the major source of potential contaminating particles from the vicinity of the disks by the length of the hydraulic lines extending from the actuator motor. In this manner, the motor can be sealed away from the disks by enclosing it in a purged box. The slaved actuation through the individual bellows actuators adjacent the disks and heads generates no particles as their motion is created by bending metal.

The positioning apparatus permits the head/access arms to be precisely positioned relative to the surfaces of the individual disks in a stack with which they are associated even when the distances separating adjacent ones of the disks are reduced to a minimum. Once the head/access arms have been positioned relative to the respective magnetic disks, the head/access arms and the magnetic disks may be merged without physical contact between the head/access arms and the individual disks.

Selected ones of the head/access arms can also be individually positioned relative to the corresponding disk with which they are associated. The ability to individually position the head/access arms is particularly important when an individual disk in a stack may be slightly deformed. For example, if a given disk is slightly concave rather than absolutely planar, the lateral positioning of corresponding individual ones of the head/access arms can be altered to ensure that the head/access arms do not come into contact with the magnetic disk.

In accordance with the present invention, therefore, a positioning apparatus for laterally positioning at least one head/access arm of a computer mass storage device relative to the plane of a rotatable storage media is disclosed. The head/access arm is positionable at a lateral distance relative to the storage media to permit contactless merging of the storage media with the head/access arm. At least one support arm is positionable at a selected lateral distance relative to the head/access arm and at least one cantilever arm is supported by the at least one support arm. The cantilever arm is engageable with the head/access arm for applying a lateral biasing force to the head/access arm to bias the head/access arm into a lateral position responsive to the selected lateral distance at which the support arm is positioned.

In a further embodiment, a position sensor senses the vertical height of the head/access arm relative to the storage media. A control element is operative responsive to indications of the lateral distance sensed by the position sensor. The control element selects the lateral distance at which the at least one support arm is positioned.

A more complete appreciation of the present invention and the scope thereof can be obtained from the accompanying drawings which are briefly summarized below, the following detailed description of the presently preferred embodiments of the invention, and the appended claims.

DETAILED DESCRIPTION OF A PREFERRED EMBODIMENT

Figure 1:
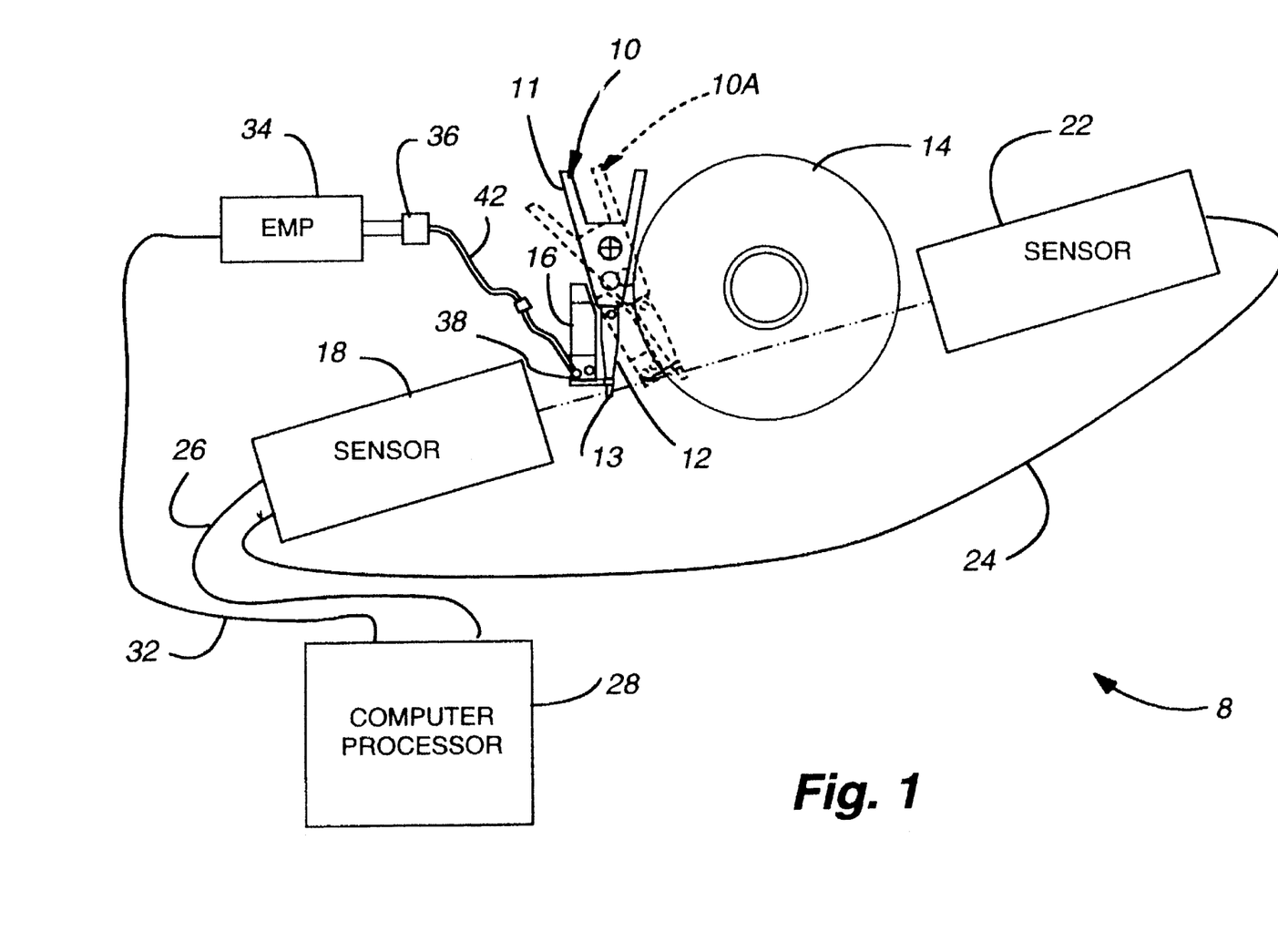
FIG. 1 is a partial plan, partial functional block view of an embodiment of the positioning apparatus of the present invention positioned together with a head/access arm assembly and an individual disk of a disk drive stack, for example, a magnetic disk drive.

FIG. 1 illustrates the positioning apparatus, shown generally at 8, of an embodiment of the present invention positioned together with head/access arm assemblies 10. Each assembly 10 may be formed of a positioner 11, an access arm 12, and a head 13. The heads 13 are positioned to access storage locations of magnetic disks 14 of a disk drive to read and/or write data thereto. A head 13 is suspended adjacent the distal end of each access arm 12 in conventional fashion.

In the plan view of FIG. 1, only top-most ones of the head/access arm assemblies 10 and magnetic disks 14 are illustrated. The head/access arms 12 are all ganged together to move in unison across the surfaces of respective ones of the magnetic disks 14. Data may be stored on both top surfaces and bottom surfaces of the magnetic disks 14. Both a downhead head/access arm and an uphead head/access arm is associated with each of the magnetic disks for positioning a downhead transducer and an uphead transducer, respectively, to access storage locations formed on top and bottom surfaces of the magnetic disks.

The positioning apparatus 8 is operable to laterally position the head/access arms 12, and hence, the heads 13 suspended therefrom relative to magnetic disks 14 associated with the head/access arms.

During assembly of the disk drive, all of the head/access arms 12 are laterally positioned in desired relationships relative to magnetic disks 14 associated therewith. Then, the head/access arms 12 are merged together with the stack of magnetic disks 14. By properly positioning the access arms 12 relative to the magnetic disks 14, contact between the head/access arm assemblies 10 and the magnetic disks 14 is avoided.

Once the head/access arms 12 have been merged together with the magnetic disks 14, the head/access arms 12 are positioned relative to the magnetic disks 14 as indicated by the head actuator arm assemblies 10A, shown in dash. Once the head/access arms 12 have been merged together with the magnetic disks 14, read and write operations may be performed upon the magnetic disks 14 in conventional fashion following assembly of the disk drive HDA.

The positioning apparatus 8 includes a head/access arm biasing mechanism 16 which shall be shown in greater detail with respect to FIGS. 2–6 below. The biasing mechanism 16 is operative to apply biasing forces to the access arms of the head/access arms 12. The biasing forces laterally position the access arms 12 and, hence, the heads 13 associated therewith.

The positioning apparatus 8 preferably also includes sensors 18 and 22 which sense the relative lateral distances between the head/access arms 12 and magnetic disks 14. The sensors 18 and 22 are formed of, for example, a light emitter and light detector pair or a single sensor 18 comprising a high resolution video camera assembly which receives images of the relative positions of the arms 12 and disks 14. The sensors 18 and 22 may be coupled together by way of line 24, and the sensor 18 is coupled by way of line 26 to a control device, here a computer processor 28. The computer processor 28 determines the relative positions of the arms 12 and magnetic heads 13 with respect to the adjacent storage media disk and, responsive thereto, generates control signals on line 32 which are applied to an electric motor positioner 34.

The electric motor positioner 34 may, for example, be formed of micrometer actuators, such as 850B Series actuators marketed by Newport Electronics, Inc. The electric motor positioner 34 may be utilized to operate a master actuator 36 which contains a hydraulic fluid. The master actuator 36 is coupled to a slave actuator 38 by way of a hydraulic line 42. The electric motor is operative responsive to the computer processor 28 to cause the master actuator 36 to transmit a desired amount of hydraulic fluid along the hydraulic line 42 to the slave actuator 38. The slave actuator 38, in turn, causes the head/access arm biasing mechanism 16 to apply lateral biasing forces to the access arms 12 of the head/access arm assemblies in manners to be described more fully below. The lateral biasing forces cause flexing of the head/access arms 12 relative to the surface planes of the magnetic disks 14.

In alternate embodiments of the present invention, a manual positioner may be substituted for the electric motor positioner 34 and an open-loop control system may be utilized in which relative lateral positions sensed by the sensors 18 and 22 are provided to an operator of the positioning apparatus 10. Responsive to the indications of the relative lateral positions sensed by the sensors 18 and 22, the operator manually actuates the manual positioner to cause the manual actuator to transmit desired amounts of hydraulic fluid along the hydraulic line 42 to the slave actuator 38.

Figure 2:
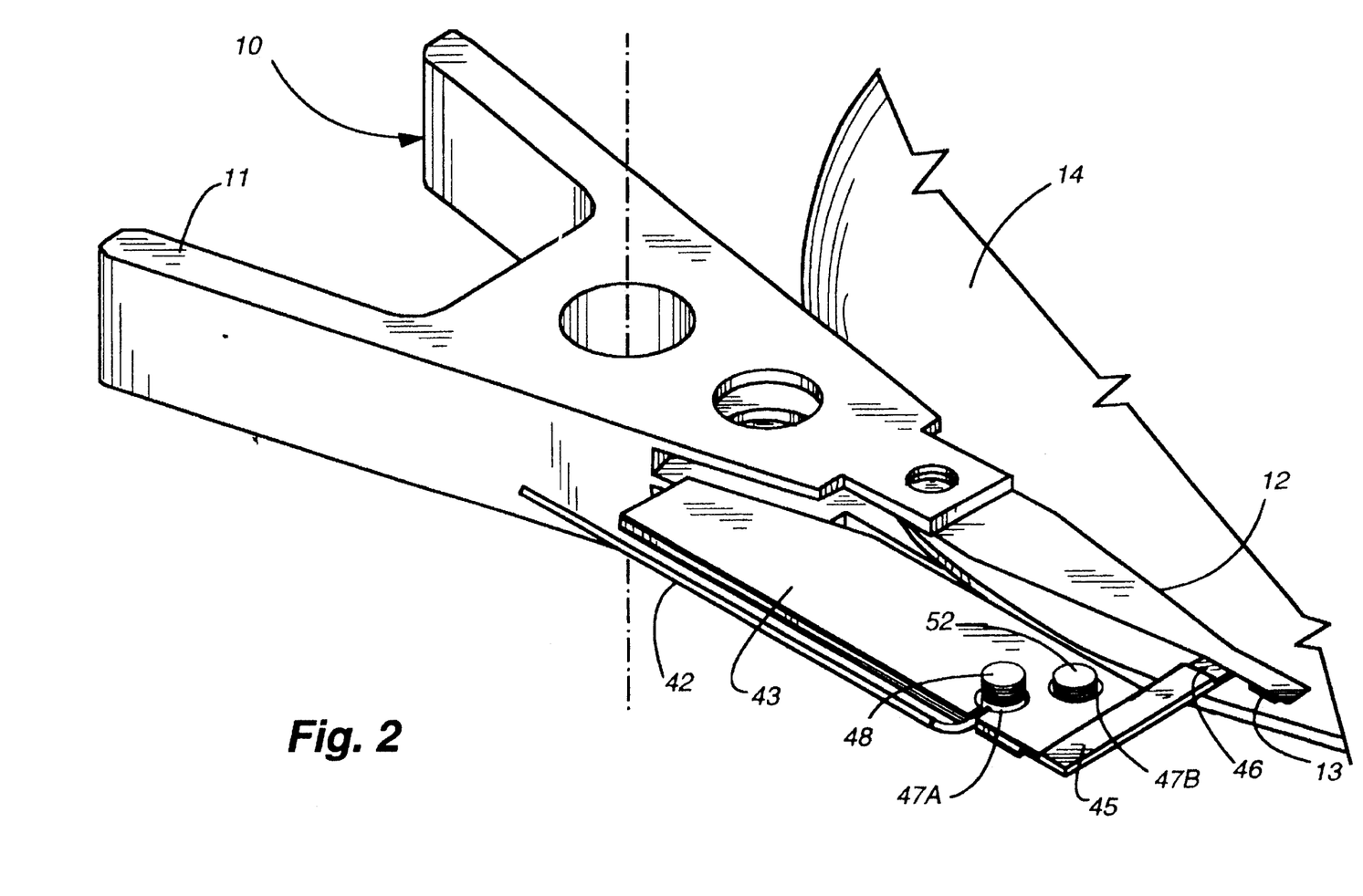
FIG. 2 is a perspective view of a portion of the positioning apparatus shown in FIG. 1 positioned to laterally bias a single "downhead" head/access arm of a disk drive.

FIG. 2 illustrates a portion of the biasing mechanism 16 positioned together with a single access arm 12 of a head/access arm assembly 10 and a single magnetic disk 14. The portion of the biasing mechanism 16 shown in FIG. 4 includes a flexure 43 which is formed of a generally parallel extending plate member. As shall be noted in the embodiment illustrated in FIGS. 3 and 4 below, the flexure 43 is formed of four separate portions which collectively form the parallel extending plate member. A cantilever arm 45 is positioned to extend beyond an end portion of the flexure 43 and includes a face surface 46 which abuts against a bottom surface of the access arm 12.

A generally circular aperture 47B extends through the flexure 43. In like manner, a generally circular aperture 47A rests on the bottom plate 54 of the flexure 43. The reverse is true for the flexures on both sides of flexure 43 and each actuator (or bellows) 48, 52 extends alternately through a single flexure but not the same flexure at the same time.

A downhead actuator 48 is positioned to extend through the aperture 47A and an uphead actuator 52 is positioned to extend through the aperture 47B. The hydraulic line 42 is positioned in fluid connection with the actuator 48 to apply a hydraulic fluid thereto. While not illustrated in the figure, the hydraulic line 42 may alternately be coupled to the actuator 52. Application of a hydraulic fluid to the actuator 48 or 52 causes expansion of the bellows like actuator in a generally vertical direction in the configuration illustrated.

The flexure 43 is laterally translatable. The cantilever arm 45 connected to the flexure 43 is laterally translatable together with translation of the flexure. Upward translation of the flexure 43 and, in turn, the cantilever arm 45, generates a lateral biasing force upon the access arm 12 of the access arm assembly 10. Such lateral biasing force causes flexing of the access arm 12 to thereby laterally position the access arm 12 and the transducer 13 supported therefrom. By appropriate lateral positioning of the flexure 43, the access arm 12 and the transducer 13 may be laterally positioned in a desired relation relative to the magnetic disk 14.

Hydraulic fluid applied to an actuator similar to the actuator 48 and 52 shown in FIG. 2 laterally positions the flexure 43. An actuator (not shown) positioned in tandem and beneath the actuator 48 illustrated in FIG. 2 causes the lateral positioning of the flexure 43 upon expansion thereof. The actuator 48 shown in FIG. 2, upon expansion thereof, causes lateral translation of a flexure (not shown) positioned thereabove. Similarly, expansion of the actuator 52 causes lateral translation of a flexure (also not shown) positioned in contact with the actuator 52.

Figure 3:
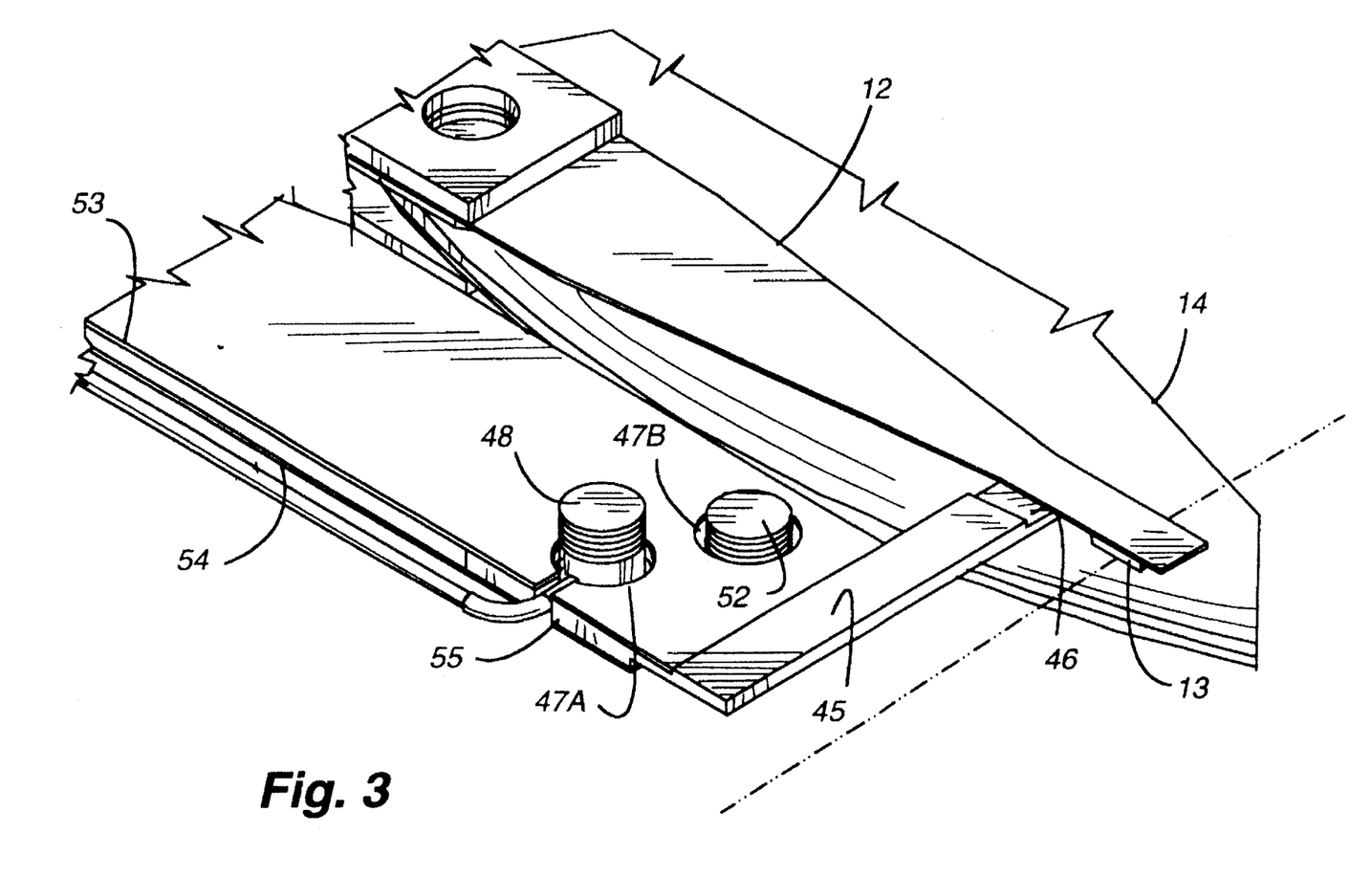
FIG. 3 is an enlarged view of a portion of FIG. 2.

FIG. 3 illustrates the flexure 43 and cantilever arm 45 which laterally biases the access arm 12 in greater detail. The flexure 43 is here shown to include a top plate 53, a bottom plate 54 and a middle, support plate 55 which extends to the cantilever arm 45. FIG. 3 illustrates the access arm 12 positioned proximate to the magnetic disk 14 once the cantilever arm 45 has laterally positioned the access arm and the access arm has been at least partially merged together with the magnetic disk 14.

Vertical translation of the flexure 43 causes corresponding vertical translation of the cantilever arm 45 in the configuration illustrated. The vertical translation of the cantilever arm 45 causes the surface 46 thereof to be positioned beneath and then abut against a lower surface of the access arm 12. Forces normal to a longitudinal axis of the access arm 12 are applied to the access arm to thereby cause flexing of the access arm. The access arm 12 and the transducer 13 can be positioned in a desired lateral relationship relative to the magnetic disk 14 by appropriate translation of the flexure 43.

Figure 4:
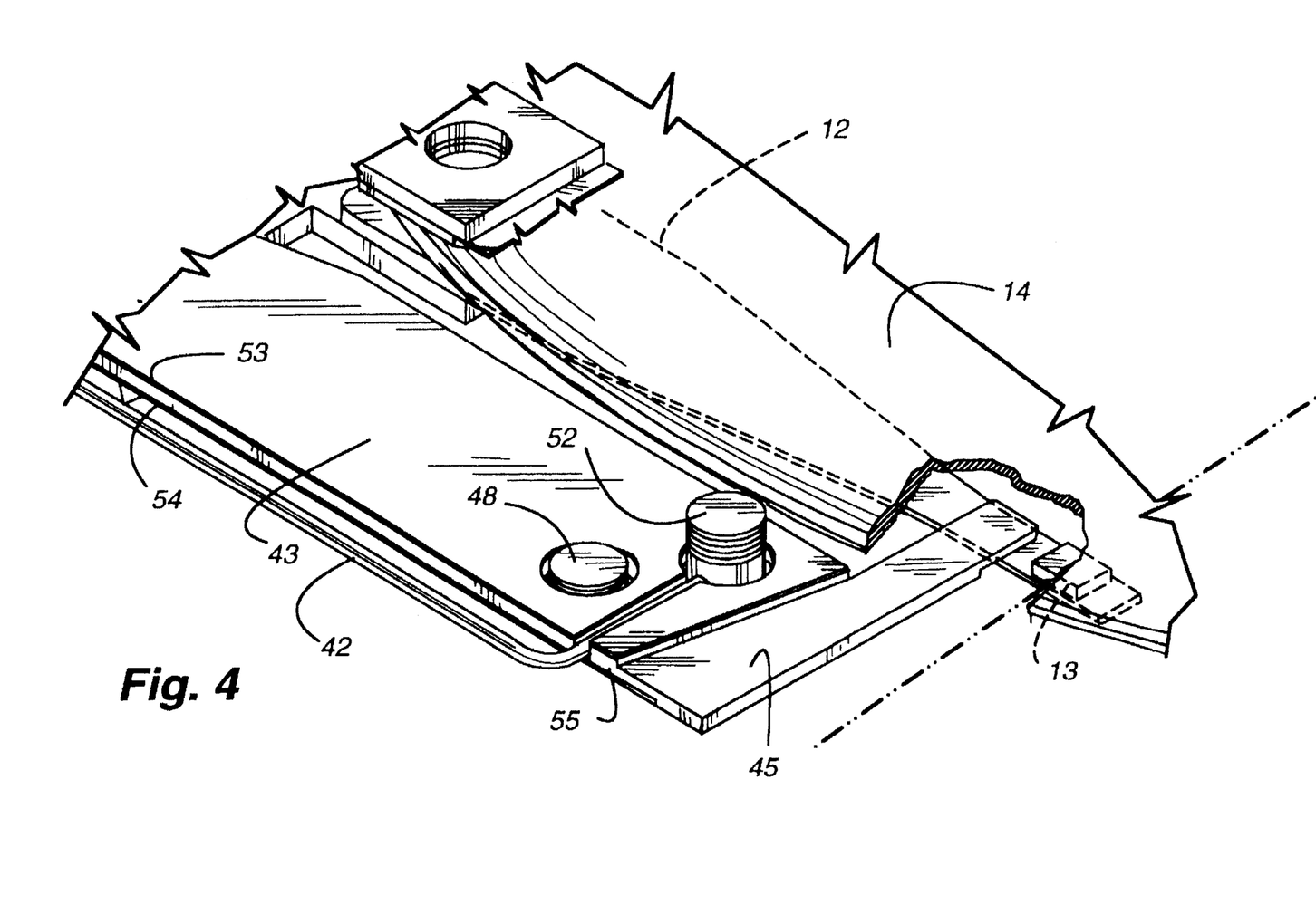
FIG. 4 is an enlarged view, similar to that shown in FIG. 3, but of a portion of the positioning apparatus to laterally bias an "uphead" head/access arm of a disk drive.

FIG. 4 is an illustration, similar to that shown in FIG. 3, but which illustrates a flexure 43 and cantilever arm 45 positioned together to apply biasing forces to laterally position an access arm supporting an uphead 13 positioned beneath a magnetic disk 14. The flexure 43 is again shown to include a top plate 53, a bottom plate 54 and middle support plate 55 extending to a cantilever arm 45. Actuators 48 and 52 are similarly again shown.

The flexure 43 and cantilever arm 45 shown in FIG. 4 generate the biasing forces to laterally position the access arm positioned beneath the magnetic disk 14. Again, the surface 46 of the cantilever arm 45 is positioned to be inserted adjacent and then abut against the access arm 12. When the flexure 43 and cantilever arm 45 are laterally translated, normal forces are applied to the access arm 12 to laterally position the access arm. There is no sliding contact between the cantilever arm 45 and the access arm. Abrasion caused by friction as a result of sliding of an element across the access arm 12 resulting in the generation of particulate contaminants is avoided.

Figure 5:
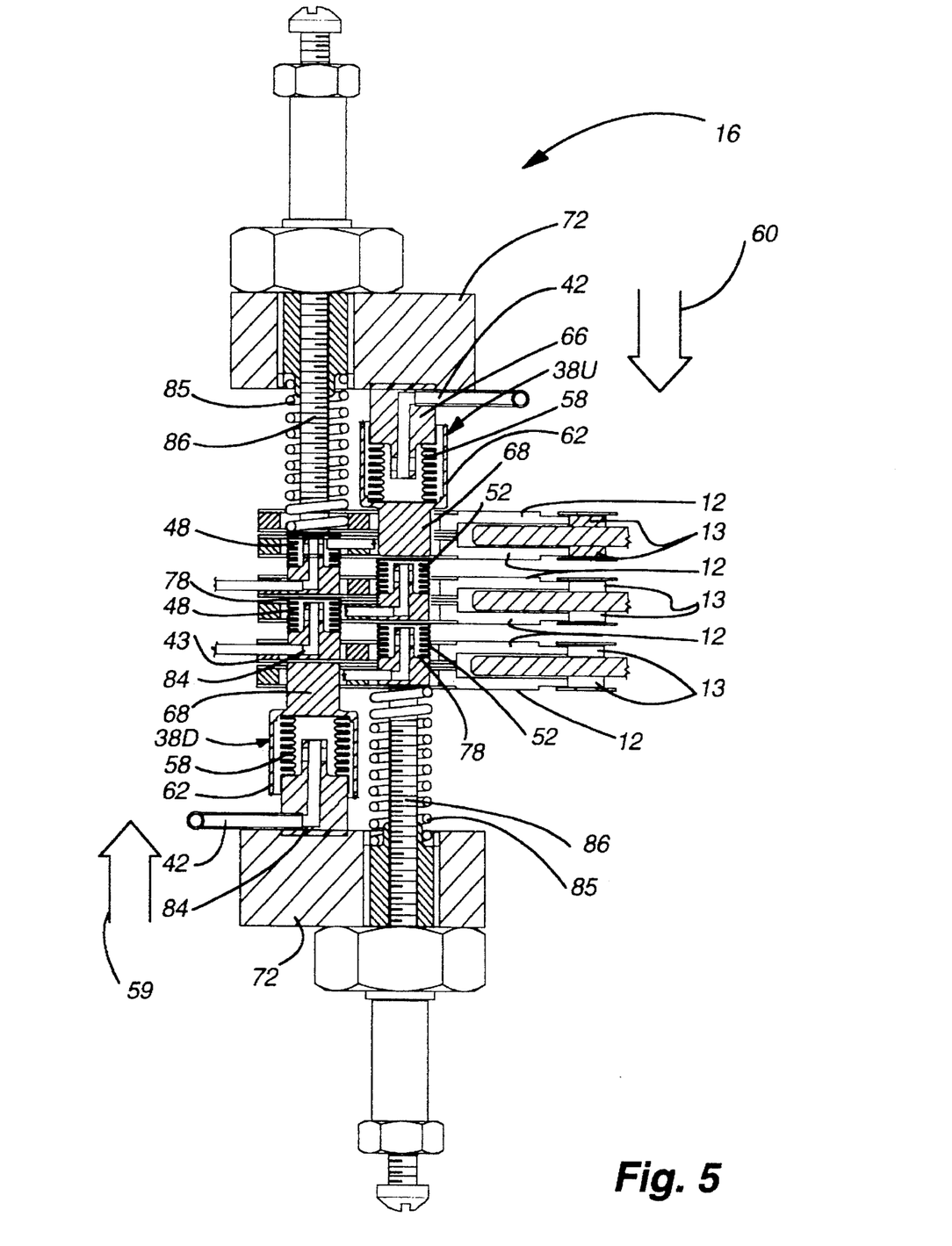
FIG. 5 is a sectional view of a portion of the positioning apparatus shown in FIG. 1 together with the head/access arms and media disks of a disk drive.

FIG. 5 illustrates the head/access arm biasing mechanism 16 positioned together with head/access arm assemblies and multiple magnetic disks of a disk drive stack during assembly thereof in greater detail. As illustrated, two head/access arm assemblies are associated with each magnetic disk 14. A downhead head/access arm assembly is positioned above top surfaces of each of the magnetic disks 14, and an uphead head/access arm assembly is positioned beneath a bottom surface of each of the magnetic disks 14. The slave actuator 38 is here shown to be formed of two separate actuators, a downhead actuator 38D and an uphead actuator 38U. The downhead actuator 38D and the uphead actuator 38U include multiple expansible bellows 58 and are alternately connectable with the hydraulic line 42 shown in FIG. 1.

For purposes of illustration, end portions of the hydraulic line 42 are shown in plugged connections with the actuators 38D and 38U, respectively. When the actuator 38D or 38U is engaged with the hydraulic line 42, actuation of the master actuator 36 transmits hydraulic fluid along the hydraulic line to be applied to the selected actuator 38D or 38U to which the hydraulic line is engaged. Application of the hydraulic fluid to the actuator 38D causes vertical expansion of the actuator in the direction indicated by the arrow 59 in the figure. Analogously, application of the hydraulic fluid to the actuator 38U causes vertical translation of the actuator in the direction indicated by the arrow 60.

The actuators 38D and 38U each include, as noted above, expansible bellows. The bellows are formed of a flexible metal cup-like element having a series of annular rings. Cylindrical covers 62 surround the bellows 58 of the actuators 38D and 38U.

The bellows 58 are supported upon base chucks 66 and extend between the base chucks 66 and access-arm engaging chucks 68. The access-arm engaging chucks 68 are formed to be integral with the covers 62, and the covers 62 and the chucks 68 are both translatable together with vertical translation of the bellows 58. The base chucks 66 are supported upon base members 72.

A top surface of the chuck 68 of the downhead actuator 38D abuts against an access arm 12 of a downhead/access arm assembly. Analogously, a top surface of the chuck 68 of the uphead actuator 52 abuts against a surface of a flexure 43 which supports an arm 45 which abuts against an access arm 12 of an uphead/access arm assembly. Application of the hydraulic fluid to the bellows 58 of the actuator 38D or 38U to cause vertical translation of the bellows in the directions indicated by the arrows 59 or 60, respectively, causes corresponding translation of the chucks 68, a flexure 43 arm 45 and, in turn, vertical translation of the access arm 12.

The biasing mechanism 16 further includes a plurality of downhead and uphead actuators 48 and 52, similar to the actuators 48 and 52 shown in FIGS. 2–4. The actuators 48 and 52 form tolerance adjust actuators. The downhead actuators 48 are positioned in tandem with the downhead actuator 38D, and the uphead actuators 52 are positioned in tandem with the uphead actuator 38U. The actuators 48 are positioned upon flexures associated with the downhead/access arms 12. Analogously, the actuators 52 are positioned upon flexures associated with the uphead/access arms 12. The actuators 48 and 52 each include a bellows 78 positioned upon a base chuck 82 analogous to the bellows 58 positioned upon base chucks 66 of the actuators 38D and 38U. The actuators 48 and 52 are also individually engageable with the hydraulic line 42.

When engaged with the hydraulic line 42, individual ones of the actuators 48 and 52 can receive hydraulic fluid to cause expansion of the bellows 78 of the individual ones of the actuators. Application of the hydraulic fluid to a bellows 78 of the actuators 48 and 52 causes expansion of the bellows in a manner analogous to expansion caused to the bellows 58 of the actuators 38D and 38U.

Each of the bellows 58 and 78 includes a sealable opening 84 capable of receiving an end portion of the hydraulic line 42. The sealable openings are operative to form a fluid-tight seal when the hydraulic line 42 is not engaged with the bellows. The seals thereby cause fluid applied to the respective actuators 38D, 38U, 48 and 52 to be held once the hydraulic fluid is applied thereto by way of the hydraulic line 42.

The biasing mechanism 16 further includes spring members 85 positioned about threaded shaft members 86. The threaded shaft members 86 are supported at the base members 72. A first of the spring members is positioned in line with the tandemly-positioned actuators 48 and the downhead actuator 38D. A second of the spring members 85 is positioned in line with the tandemly-positioned actuators 52 positioned together with the uphead actuator 38U. The spring members 85 are operative to generate spring bias forces opposing the expansive forces of the bellows 58 or 78 when hydraulic fluid is applied thereto.

Figure 6:
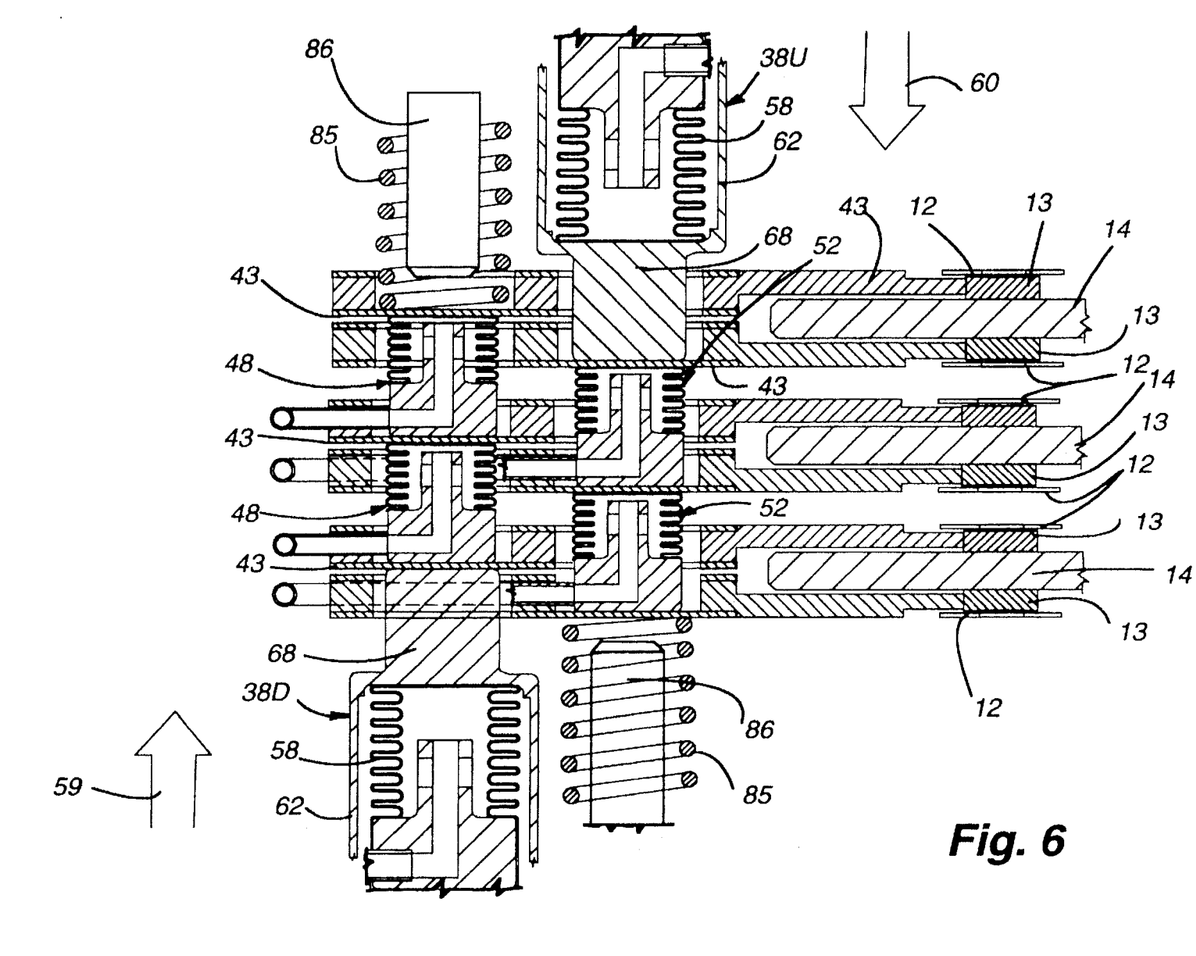
FIG. 6 is an enlarged view of a portion of FIG. 5.

FIG. 6 illustrates a portion of the biasing mechanism 16 shown in FIG. 5 in greater detail. FIG. 6 again illustrates the downhead and uphead actuators 38D and 38U, the bellows 58 of the actuators 38D and 38U, the covers 62 surrounding the bellows 58 and the chucks 66 and 68. Abutment of top surfaces of the chucks 68 against the flexures 43 are again illustrated in the figure.

When fluid is applied to the bellows 58 of the downhead actuator to cause expansion of the bellows, the bellows 58, the cover 62, and the chuck 68 are all caused to translate in the direction indicated by the arrow 59. Translation of the chuck 68, in turn, causes the flexure 43 to be translated in the same direction. The actuator 48 seated upon the flexure 43, in turn, is also caused to be translated in the same direction as the direction indicated by the arrow 59. In turn, such translation causes translation of a flexure 43 positioned above the actuator 48 and, again in turn, translation of the actuator 48 seated upon the second flexure 43. Again in turn, translation of the second actuator 48 causes translation of an additional flexure 43 positioned above the second actuator 48.

Application of hydraulic fluid to the uphead actuator 38U causes analogous translation of the flexures 43 and actuators 52 positioned in-line with the uphead actuator 38U.

Application of hydraulic fluid to individual ones of the actuators 48 or 52 causes expansion of the bellows 76 associated therewith. Such expansion causes translation of the bellows and the flexure 43 positioned in abutting engagement with the bellows 58. Actuators 52 positioned above the actuator to which the hydraulic fluid is applied are caused to be translated as are the flexures 43 positioned in abutting engagement with the additional actuators.

In this manner, application of the hydraulic fluid to any of the actuators 38D, 38U, 48, or 52 causes vertical translation of all flexures 43 positioned above such actuators. Application of hydraulic fluids to either of the uphead or downhead actuators 38U or 38D causes vertical translation of all of the flexures 43 positioned in line therewith, and application of hydraulic fluid to an actuator 76 causes vertical translation of the flexures 43 positioned thereabove.

Figure 7:
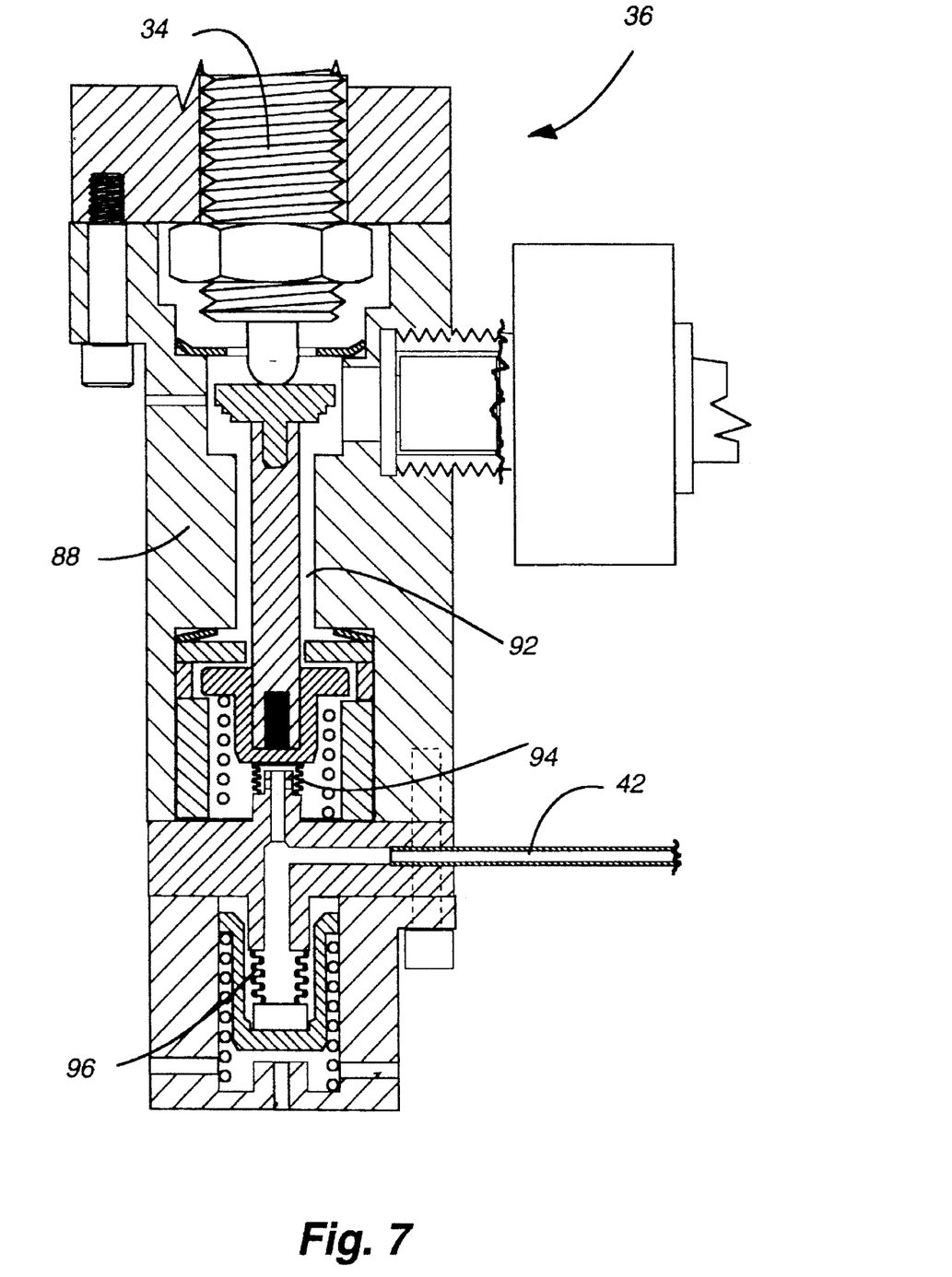
FIG. 7 is a cross-sectional view of another portion of the positioning apparatus of an embodiment of the present invention.

FIG. 7 illustrates the master actuator 36 shown previously in FIG. 1. The master actuator transmits hydraulic fluid along the hydraulic line 42 to a selected one of the actuators 38D, 38U, 48, or 52. A portion of the electric motor positioner 34 is shown in engagement with the master actuator. The master actuator is generally longitudinal in configuration and includes a housing 88 having a longitudinally extending channel 92 formed therein. The actuator 36 includes bellows 94 and 96 which contain hydraulic fluid which may be transmitted along the hydraulic line 42 depending upon the relative position of the motor positioner 34. Translation of the shaft of the motor positioner 34 into the actuator 36 generates forces upon the bellows 94 which, in turn, causes transmission of the hydraulic fluid along the line 42. The master actuator 36 converts the linear position of the shaft of the motor positioner into transmission of a desired amount of hydraulic fluid along the line 42. Translation of the shaft of the positioner 34 in a direction out of the actuator 36 permits hydraulic fluid to flow back into the internal chamber of the actuator.

In operation, the sensors 18 and 22 (or a high resolution video camera utilized individually as a sensor 18) sense the relative lateral positions of the access arm assemblies 10 relative to the surface planes of the individual storage media disks associated therewith. Responsive these determinations, the electric motor positioner 34 causes a desired amount of hydraulic fluid to be applied to selected ones of the actuators to laterally position the access arm assemblies 10 relative to the magnetic disks 14. Once each of the actuator arm assemblies 10 have been positioned relative to the surfaces of the magnetic disks 14, the access arm assemblies and the magnetic disks may be merged theretogether without contact between the head/access arm assemblies and the magnetic disks.

Because the lateral positioning of the head/access arms is effectuated by application of forces normal to the longitudinal axes of the access arms, frictional, sliding contact between the positioning apparatus and the actuator arms is avoided. Additionally, the positioning apparatus permits precise positioning of the actuator arms relative to the magnetic disks and the vertical position of each actuator arm is individually adjustable by selected application of hydraulic fluid to the respective actuators. The positioning apparatus may be conveniently furnished and used in conjunction with small form factor disk drives.

As disclosed herein the apparatus and method of the present invention moves the heads on their suspensions first laterally, or axially, to squeeze upheads and downheads close enough together to clear the gap between adjacent disks so that the entire merge mechanism along with the heads, suspensions and positioner can be translated radially between disks. Then the heads and suspensions are allowed to release axially until the heads are resting on the disk surface and a gap occurs between the lift arm and suspension. At this point, the merge mechanism may be removed from between the disks.

Presently-preferred embodiments of the present invention have been described with a degree of particularity. The previous descriptions are of preferred examples for implementing the invention, and the scope of the invention should not necessarily be limited by this description. The scope of the present invention is defined by the following claims.

What is claimed is:

1. A positioning apparatus for laterally positioning at least one head/access arm of a computer mass storage device relative to a rotatable storage media, the head/access arm positionable at a lateral distance relative to the storage media to permit non-friction and non-sliding merging of the storage media with the head/access arm, said positioning apparatus comprising:

at least one support arm positionable at a selected lateral height relative to the head/access arm, at least one cantilever arm supported by said at least one support arm, said cantilever arm engageable with the head/access arm for applying a lateral biasing force to the head/access arm to bias the head/access arm into a laterally displaced position relative to said storage media responsive to the selected lateral distance at which said support arm is positioned, a bellows engageable with said support arm for positioning said support arm at the selected lateral distance, a fluid actuator for applying an expansion fluid to said bellows, the fluid applied to said bellows for expanding said bellows in a vertical direction, a seal defined within the bellows, said seal for maintaining fluid positioned within said bellows therein when said fluid actuator is disengaged from said bellows, and, when unsealed, for permitting said fluid actuator to engage with said bellows.

2. The positioning apparatus of claim 1 wherein said bellows being expandable into selected vertical heights, the vertical height into which the bellows is expanded determinative of the lateral distance at which the support arm is positioned.

3. The positioning apparatus of claim 2 wherein said bellows includes a top surface positionable in abutting engagement against said support arm, said bellows expandable in a vertical direction to cause corresponding translation of said support arm, thereby to position said support arm at the selected lateral position.

4. The positioning apparatus of claim 1 further comprising a position sensor for sensing the lateral distance of the head/access arm assembly relative to the storage media.

5. The positioning apparatus of claim 4 further comprising a control element operative responsive to indications of the lateral position sensed by said position sensor, said control element for selecting the lateral distance at which said at least one support arm is positioned.

6. A method for laterally positioning at least one head/access arm of a computer mass storage device relative to rotatable storage media, the head/access arm assembly positionable at a lateral distance relative to the storage media to permit non-sliding and non-friction merging of the storage media with the head/access arm assembly, said method comprising the steps of:

engaging a bellows with a cantilever arm for laterally positioning the cantilever arm with respect to a surface portion of the head/access arm assembly, applying an expansion fluid to said bellows with a fluid actuator for expanding said bellows in a vertical direction, thereby applying a lateral biasing force normal to a surface of the head/access arm relative to the storage media and altering the lateral position of the cantilever arm, and providing a seal within the bellows for maintaining fluid positioned within said bellows therein when said fluid actuator is disengaged from said bellows, and when said bellows is unsealed, for permitting said fluid actuator to engage with said bellows.

7. A positioning apparatus for laterally positioning a plurality of head/access arms of a computer mass storage device associated with and relative to a plurality of tandemly-positioned rotatable storage media, the head/access arm positionable at a lateral distance relative to the storage media to permit non-sliding and non-friction merging of the storage media with the head/access arms, said positioning apparatus comprising:

a plurality of support arms, each of said plurality of support arms being associated with each of the head/access arms, a plurality of cantilever arms, each of said plurality of cantilever arms being supported by each of said support arms and engageable with each of the head/access arms for applying a lateral biasing force to the head/access arms to bias the head/access arms into a laterally displaced position relative to said storage media responsive to selected lateral distance at which said support arms are positioned, a plurality of shims, each shim of said plurality of shims engageable with a support arm of said plurality of support arms for positioning said support arms at selected lateral distances, each of said shims comprises an expansible bellows, a fluid actuator comprising a master actuator and at least one slave actuator, the fluid actuator selectably engageable with at least a selected one of said bellows for applying an expansion fluid to said bellows, the fluid applied to said bellows for expanding said bellows in a vertical direction, and a seal defined within each said bellows, said seal for maintaining fluid positioned within each said bellows therein when said fluid actuator is disengaged from said bellows, and, when unsealed, for permitting said fluid actuator to engage with the bellows.

8. The positioning apparatus of claim 7 wherein each of the expansible bellows includes a top surface positionable in abutting engagement against a support arm of said plurality of support arms, each of said bellows expandable in the vertical direction to cause corresponding translation of said support arm positioned in abutting engagement therewith.

9. The positioning apparatus of claim 7 wherein said master actuator being selectably engageable with said slave actuator for applying the expansion fluid to said slave actuator, said slave actuator positioned beneath a bottom one of selected ones of said plurality of expansible bellows and expansible responsive to application of the expansion fluid thereto, said slave actuator for laterally positioning in unison each of the head/access arm assemblies associated with the selected ones of the plurality of expandable bellows.

10. The positioning apparatus of claim 7 wherein the at least one head/access arm assembly associated with each of the plurality of tandemly-positioned rotatable storage media comprises an uphead/access arm and a downhead/access arm, wherein said plurality of expandable bellows comprise a first group of bellows and a second group of bellows wherein each of the bellows of the first group of bellows is associated with an uphead/access arm and wherein each of the bellows of the second group of bellows is offset from the bellows of the first group of bellows and is associated with a downhead/access arm.

11. The positioning apparatus of claim 10 wherein said at least one slave actuator comprises a downhead slave actuator positioned in-line with the first group of bellows and an uphead slave actuator positioned in-line with the second group of bellows.

* * * * *